(12) United States Patent
Noto et al.

(10) Patent No.: US 11,747,294 B2
(45) Date of Patent: Sep. 5, 2023

(54) WATER IMMERSION DETECTION DEVICE AND WATER IMMERSION DETECTION METHOD FOR DETECTING INUNDATION OF OPTICAL FIBER

(71) Applicant: NIPPON TELEGRAPH AND TELEPHONE CORPORATION, Tokyo (JP)

(72) Inventors: Kazutaka Noto, Musashino (JP); Nazuki Honda, Musashino (JP); Hiroyuki Oshida, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/798,299

(22) PCT Filed: Feb. 13, 2020

(86) PCT No.: PCT/JP2020/005593
§ 371 (c)(1),
(2) Date: Aug. 8, 2022

(87) PCT Pub. No.: WO2021/161459
PCT Pub. Date: Aug. 19, 2021

(65) Prior Publication Data
US 2023/0085614 A1 Mar. 16, 2023

(51) Int. Cl.
*G01N 25/68* (2006.01)
*G01K 11/322* (2021.01)

(52) U.S. Cl.
CPC ........... *G01N 25/68* (2013.01); *G01K 11/322* (2021.01)

(58) Field of Classification Search
CPC ....... G01N 21/4795; G01N 2021/1765; G01N 21/25; G01N 21/27; G01N 21/6458; G01N 21/6486; G01N 2223/419; G01N 23/046; G01N 33/4833; G01N 15/1459; G01N 2021/1708; G01N 2021/1727; G01N 21/1717; G01N 21/41; G01N 21/6456; G01N 15/1056; G01N 15/1429;
(Continued)

(56) References Cited

U.S. PATENT DOCUMENTS

2009/0148112 A1* 6/2009 Koyamada ......... G02B 6/03638
385/127

FOREIGN PATENT DOCUMENTS

CN 201765352 U * 3/2011
CN 109143461 A * 1/2019 ......... G01D 5/35364
(Continued)

OTHER PUBLICATIONS

Kenichi Nakazawa et al., Improvement water sensor module for detecting water in cable joints, Video Information Media Society Technical Report, vol. 33, No. 52, 2009, pp. 89-93.

*Primary Examiner* — Michael P Stafira
(74) *Attorney, Agent, or Firm* — Harness, Dickey & Pierce, P.L.C.

(57) ABSTRACT

An object of the present disclosure is to realize water immersion detection that does not require a replacement module, and does not cause any optical loss. The present disclosure relates to a device configured to measure guided acoustic wave Brillouin scattering in a measurement target optical fiber, and detect water immersion of the measurement target optical fiber based on a characteristic around a peak of the guided acoustic wave Brillouin scattering.

9 Claims, 21 Drawing Sheets

(58) Field of Classification Search
CPC ........... G01N 15/1434; G01N 15/1436; G01N 15/1484; G01N 2015/0065; G01N 2015/1006; G01N 2015/1043; G01N 2015/1415; G01N 2015/1486; G01N 2015/149; G01N 2021/0112; G01N 2021/638; G01N 21/01; G01N 21/1702; G01N 21/49; G01N 21/534; G01N 2291/02466; G01N 2291/02827; G01N 27/308; G01N 27/3275; G01N 27/3276; G01N 27/3277; G01N 27/3278; G01N 29/036; G01N 29/12; G01N 29/222; G01N 29/2418; G01N 33/2888; G01N 33/487; G01N 33/4915; G01N 33/54386; G01N 21/65; G01N 29/2425; G01N 21/31; G01N 21/658; G01N 15/0205; G01N 2021/1704; G01N 21/33; G01N 21/35; G01N 11/00; G01N 2021/458; G01N 21/45; G01N 29/028; G01N 15/0211; G01N 2021/391; G01N 2035/00158; G01N 21/51; G01N 21/554; G01N 21/774; G01N 21/88; G01N 2201/08; G01N 25/00; G01N 25/18; G01N 33/383; G01N 33/54346; G01N 33/54373; G01N 33/553; G01N 35/08; G01N 2015/0238; G01N 2021/4726; G01N 2021/8528; G01N 21/0303; G01N 21/17; G01N 21/4133; G01N 21/8507; G01N 2201/06113; G01N 2291/018; G01N 2291/022; G01N 33/18; G01N 2021/0346; G01N 2021/655; G01N 2021/945; G01N 21/05; G01N 21/09; G01N 21/47; G01N 21/7703; G01N 21/94; G01N 21/958; G01N 2291/0256; G01N 23/203; G01N 25/68; G01N 27/07; G01N 27/28; G01N 27/403; G01N 29/04; G01N 29/14; G01N 29/32; G01N 29/46; G01K 11/32; G01K 11/322; G01K 11/3206; G01K 11/324; G01K 15/007; G01K 11/00; G01K 11/12

See application file for complete search history.

(56) References Cited

FOREIGN PATENT DOCUMENTS

| | | | | | |
|---|---|---|---|---|---|
| EA | 034423 | B1 | * | 2/2020 | |
| JP | H07280695 | A | * | 10/1995 | |
| JP | 2004037358 | A | * | 2/2004 | |
| JP | 2008124573 | A | * | 5/2008 | |
| JP | 4361162 | B2 | * | 11/2009 | |
| JP | 2010019814 | A | * | 1/2010 | |
| JP | 2015206594 | A | | 11/2015 | |
| KR | 20200042705 | A | * | 4/2020 | |
| WO | WO-2017077257 | A1 | * | 5/2017 | ......... G01D 5/35303 |
| WO | WO-2018193440 | A1 | * | 10/2018 | ............ G01B 11/16 |
| WO | WO-2019022084 | A1 | * | 1/2019 | ............ G01D 5/353 |

\* cited by examiner

Fig. 4

CHANGE IN HALF BANDWIDTH[Hz]

|  | FIRST CORE WIRE | FOURTH CORE WIRE |
|---|---|---|
| BEFORE WATER IMMERSION | 3061003 | 3000741 |
| AFTER WATER IMMERSION | 3306058 | 3379628 |

Fig. 5

ERROR FROM LORENZ CURVE

|  | FIRST CORE WIRE (SUM) | FOURTH CORE WIRE (SUM) | FIRST CORE WIRE (AVERAGE) | FOURTH CORE WIRE (AVERAGE) |
|---|---|---|---|---|
| BEFORE WATER IMMERSION | 1232.127 | 1284.897 | 0.87509 | 0.912569 |
| AFTER WATER IMMERSION | 942.2364 | 938.7404 | 0.669202 | 0.666719 |

WATER IMMERSION DETECTION DEVICE AND WATER IMMERSION DETECTION METHOD FOR DETECTING INUNDATION OF OPTICAL FIBER

CROSS-REFERENCE TO RELATED APPLICATIONS

This application is a 371 U.S. National Phase of International Application No. PCT/JP2020/005593, filed on Feb. 13, 2020. The entire disclosure of the above application is incorporated herein by reference.

TECHNICAL FIELD

The present invention relates to maintenance and operation of an optical fiber.

BACKGROUND ART

Whether or not an optical fiber has been immersed in water affects the breakage rate of the optical fiber, and is thus essential for maintenance of the optical fiber. As a method for detecting whether or not an optical fiber has been immersed in water, there is a method in which a module to be subjected to a bending loss due to water immersion is mounted in a closure, and an optical loss is measured by an OTDR (Optical Time Domain Reflectometer) or an optical power meter.

CITATION LIST

Patent Literature

[PTL 1] Japanese Patent Application Publication 2015-206594

Non Patent Literature

[NPL 1] Kenichi NAKAZAWA et al., "Improvement water sensor module for detecting water in cable joints", ITE Technical Report published by The Institute of Image Information and Television Engineers, BCT2009-130, pp. 89-93, Nov. 26, 2009.

SUMMARY OF THE INVENTION

Technical Problem

However, when the module needs to be mounted, water immersion can be detected only at a position at which the module is installed, and the entire optical fiber cannot be managed. Also, once the module reacts, the module must be replaced, and it is not possible to recognize the actual state until the replacement of the module is complete. Also, if a plurality of modules are mounted in one route, and the plurality of modules react, it will be difficult to perform measurement.

Therefore, an object of the present disclosure is to provide water immersion detection that does not require any replacement module and does not cause any optical loss.

Means for Solving the Problem

The present disclosure measures a change in an external state of an optical fiber using guided acoustic wave Brillouin scattering (GAWBS).

A device according to the present disclosure is configured to measure guided acoustic wave Brillouin scattering of a measurement target optical fiber, and detect a water immersion in the measurement target optical fiber based on a characteristic around a peak of the guided acoustic wave Brillouin scattering.

A method according to the present disclosure includes the steps of:

measuring guided acoustic wave Brillouin scattering in a measurement target optical fiber; and detecting a water immersion in the measurement target optical fiber based on a characteristic around a peak of the guided acoustic wave Brillouin scattering.

Effects of the Invention

Measurement of guided acoustic wave Brillouin scattering in a measurement target optical fiber allows determination of water immersion only using an existing optical fiber. Therefore, the present disclosure can provide water immersion detection that does not require any replacement module and does not cause any optical loss.

BRIEF DESCRIPTION OF DRAWINGS

FIG. 4 illustrates examples of changes in half bandwidths [Hz].

FIG. 5 illustrates examples of errors from Lorenz curves between before water immersion and after water immersion.

DESCRIPTION OF EMBODIMENTS

Figure 1:
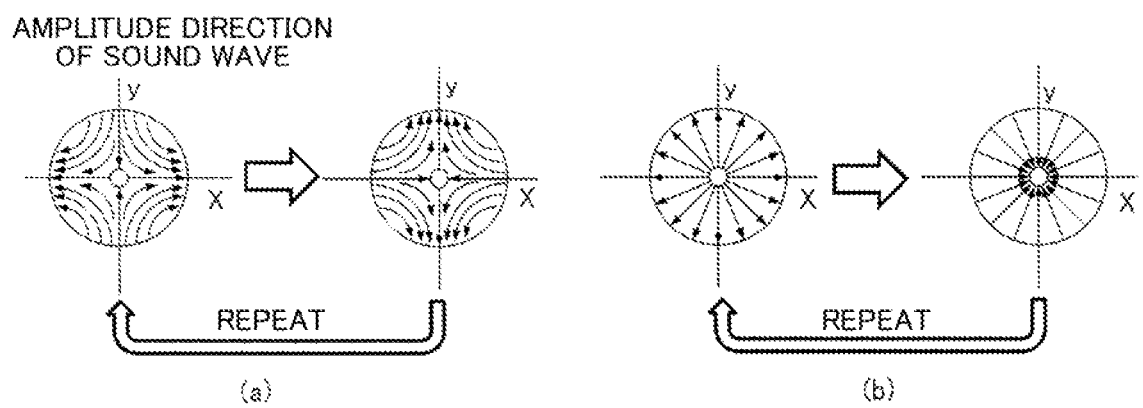
FIG. 1 illustrate examples of GAWBS, with FIG. 1(a) showing depolarized GAWBS and FIG. 1(b) showing polarized GAWBS.

Hereinafter, embodiments of the present disclosure will be described in detail with reference to the drawings. Note that the present disclosure is not limited to the embodiments described below. These implementation examples are merely examples, and the present disclosure can be implemented in various forms modified and changed based on the knowledge of a person skilled in the art. Note that the constituent components with the same reference numerals in the present specification and the drawings indicate the same components.

Principle

FIG. 1 shows examples of GAWBS. In an optical fiber, heat is generated when a core absorbs light, and as a consequence thereof, sound waves are generated. GAWBS is a phenomenon in which due to the reflection of the sound waves traveling in a radial direction, the polarized wave or the phase of light that travels in the optical fiber are modulated. The GAWBS spectrum depends on a transmission loss of the sound waves, and is mainly caused by the reflectance of the sound waves. The reflectance of the sound waves in the optical fiber is affected by an acoustic impedance on the outside of the optical fiber. The acoustic impedance on the outside of the optical fiber changes with a change in an atmospheric environment of the optical fiber.

Figure 2:
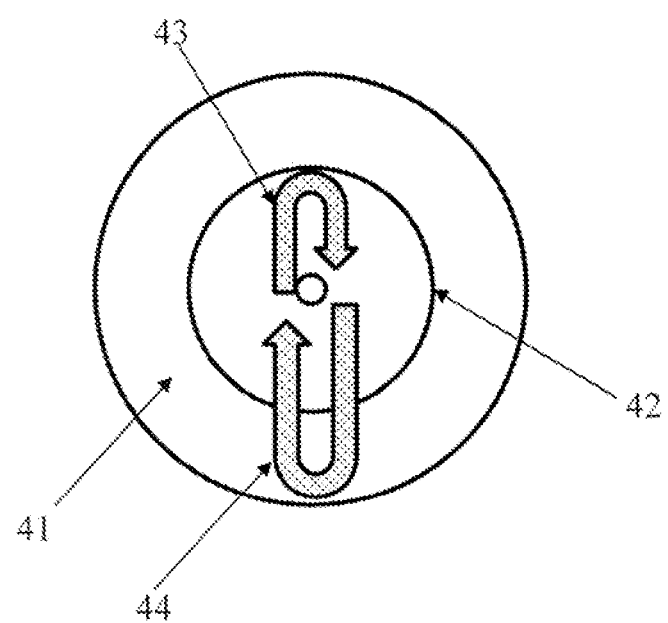
FIG. 2 illustrates examples of GAWBS that occurs in an optical fiber.

FIG. 2 shows examples of GAWBS that occur in an optical fiber. In a water immersion state, an external environment of a covering 41 changes from air to water. In response thereto, a GAWBS 44 that occurs outside a glass 42 and the covering 41 changes. It is conceivable that the acoustic impedance also changes, and the spectrum of the GAWBS changes. The present disclosure uses the change to detect water immersion of the optical fiber.

Figure 3:
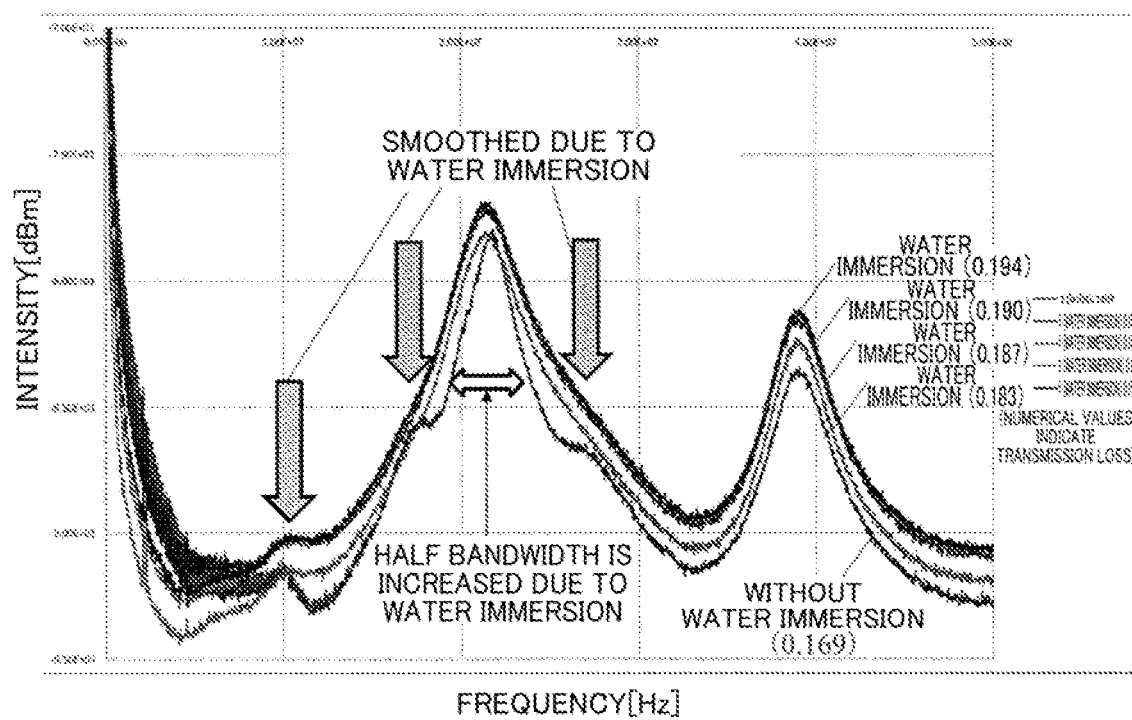
FIG. 3 illustrates examples of spectral waveforms of GAWBS.

FIG. 3 shows examples of spectral waveforms of GAWBS. Values in parentheses indicate transmission losses. It is clear that the spectrum changes due to water immersion. Accordingly, the present disclosure uses an arbitrary combination of spectral changes of GAWBS as will be described below to detect a change in the external state of an optical fiber.

Kurtosis of Spectrum of GAWBS

As shown in FIG. 3, peaks are smoothed by water immersion, and the kurtosis of the peaks decreases. Kurtosis refers to how sharp a peak compared to a normal distribution is. Accordingly, the present disclosure employs an aspect in which the kurtosis of a spectrum is observed, and water immersion is detected based on a decrease in the kurtosis. For example, the kurtosis of a spectrum can be calculated by the following expression. Here, it is assumed that the sample size is denoted by n, an average value of pieces of data xi (i: 1, 2, . . . , n) is denoted by x, and a sample standard deviation is denoted by s.

[Math. 1]

$$\frac{n(n+1)}{(n-1)(n-2)(n-3)}\sum_{i=1}^{n}\frac{(x_i-\overline{x})^4}{s^4}-\frac{3(n-1)^2}{(n-2)(n-3)} \quad (1)$$

Line Width of Spectrum of GAWBS

Air and water have different acoustic impedances, and thus if water immersion occurs, the line width of a spectrum of GAWBS increases. Accordingly, the present disclosure can employ an aspect in which water immersion is detected based on a difference in the line width between spectra of GAWBS. The line width of a spectrum can be calculated by approximating the spectrum with a Lorenz curve. The approximation with a Lorenz curve is calculated by performing fitting on a portion around every peak of the spectrum, using the Lorenz curve, for example.

FIG. 4 illustrates examples of changes in half bandwidth [Hz]. It is clear that the half bandwidth after water immersion is greater than the half bandwidth before water immersion. Accordingly, the half bandwidth of a peak of a spectrum of GAWBS is measured before water immersion in advance, and if the half bandwidth is increased, it is possible to determine that water immersion has occurred, based thereon.

Amount of Shift from Lorenz Curve

FIG. 5 illustrates examples of amounts of shift from a Lorenz curve before water immersion and after water immersion. An amount of shift from a Lorenz curve means a difference from an experimental value when fitting is performed on a spectrum using a Lorenz curve. Also, a sum refers to the sum of differences from the experimental values at positions, and an average refers to the value obtained by dividing the corresponding sum by the number of positions. It is clear that amounts of shift from the Lorenz curve after water immersion are smaller than amounts of shift from the Lorenz curve before water immersion. Accordingly, the amounts of shift from the Lorenz curve are measured before water immersion in advance, and if an amount of shift is reduced, it is possible to determine that water immersion has occurred, based thereon.

From the results shown in FIG. 3, it is conceivable that the spectrum changes because the intensity of GAWBS from the covering 41 is reduced due to a change from air to water, and the intensity of GAWBS from the glass 42, that is, the clad is dominant. Note, however, that, the spectra shown in FIG. 3 are spectra of a first core wire measured using a four-core tape. In the case of a tape core wire optical cable including such a plurality of optical fibers, it is conceivable that the GAWBS from the covering 41 are not completely eliminated.

In the experimental results shown in FIG. 3, a GAWBS 43 occurring within the glass 42 and the covering 41, and the GAWBS 44 occurring outside the glass 42 and the covering 41 are superimposed on each other. Accordingly, if water immersion occurs, the environment outside the covering 41 changes from air to water, the acoustic impedance changes, and the GAWBS 44 occurring outside the glass 42 and the covering 41 is reduced. Therefore, it is conceivable that the GAWBS 43 occurring within the glass 42 and the covering 41 is dominant. Also, it is conceivable that due to the water pressure, the covering 41 is compressed, the acoustic impedance changes, and the GAWBS 43 occurring within the glass 42 and the covering 41 also changes.

Measurement Method

A change in a spectrum of GAWBS due to water immersion occurs regardless of whether or not there is polarization of light. Although GAWBS includes polarized GAWBS and depolarized GAWBS, both of them can thus be used in the present disclosure.

Also, although a spectrum of GAWBS includes a plurality of peaks, any of the peaks can be used. As shown in FIG. 3, the spectral waveform largely changes at a low-frequency peak of the plurality of peaks. Accordingly, it is also possible to only detect a change in the spectral waveform at a low-frequency peak, such as the lowest frequency of the plurality of peaks.

Fourier transformation of a waveform of a spectrum analyzer or an oscilloscope can be used to measure a spectrum of GAWBS. Also, a Brillouin gain spectrum may also be used to measure a spectrum of GAWBS. Also, a frequency band in which a peak appears may be extracted by a filter in the measurement of a spectrum of GAWBS. For example, a frequency that has a large intensity at a peak of the spectrum of GAWBS from the covering 41 is extracted. This facilitates signal processing. Also, the spectrum is preferably subjected to arithmetic mean processing, so that measurement noise is reduced.

First Embodiment

Figure 6:
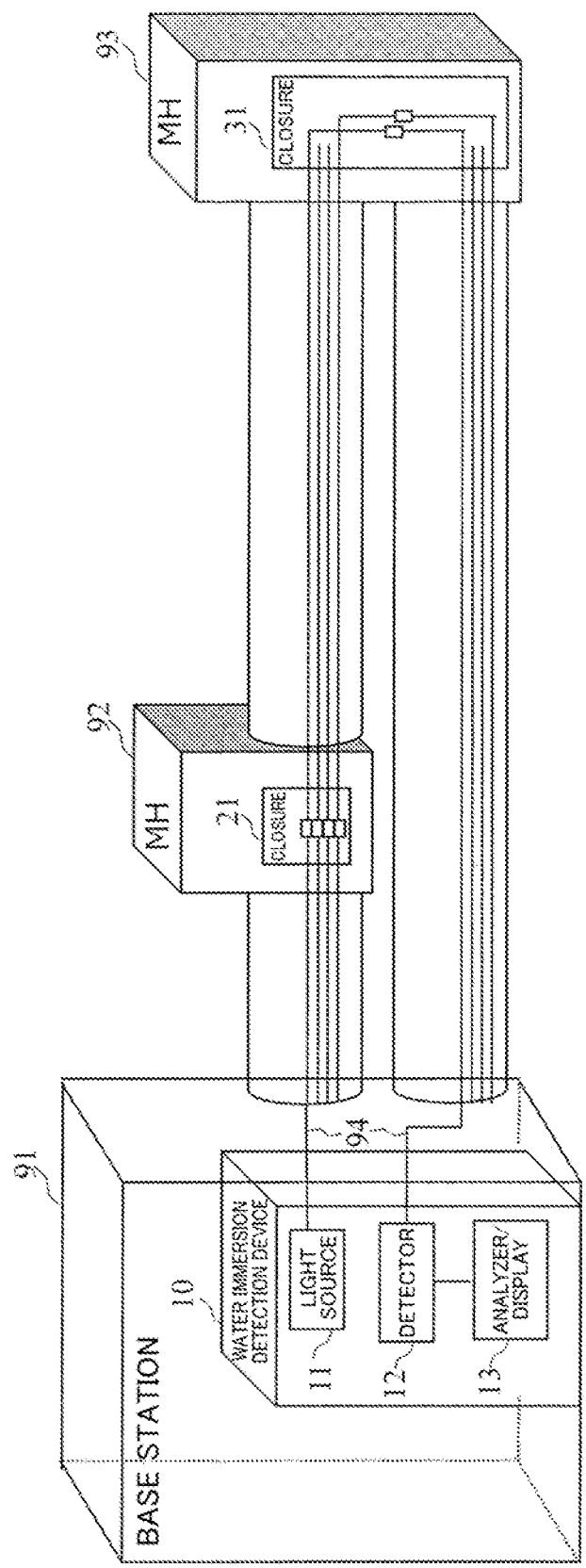
FIG. 6 illustrates a first system configuration example according to a first embodiment.
Figure 7:
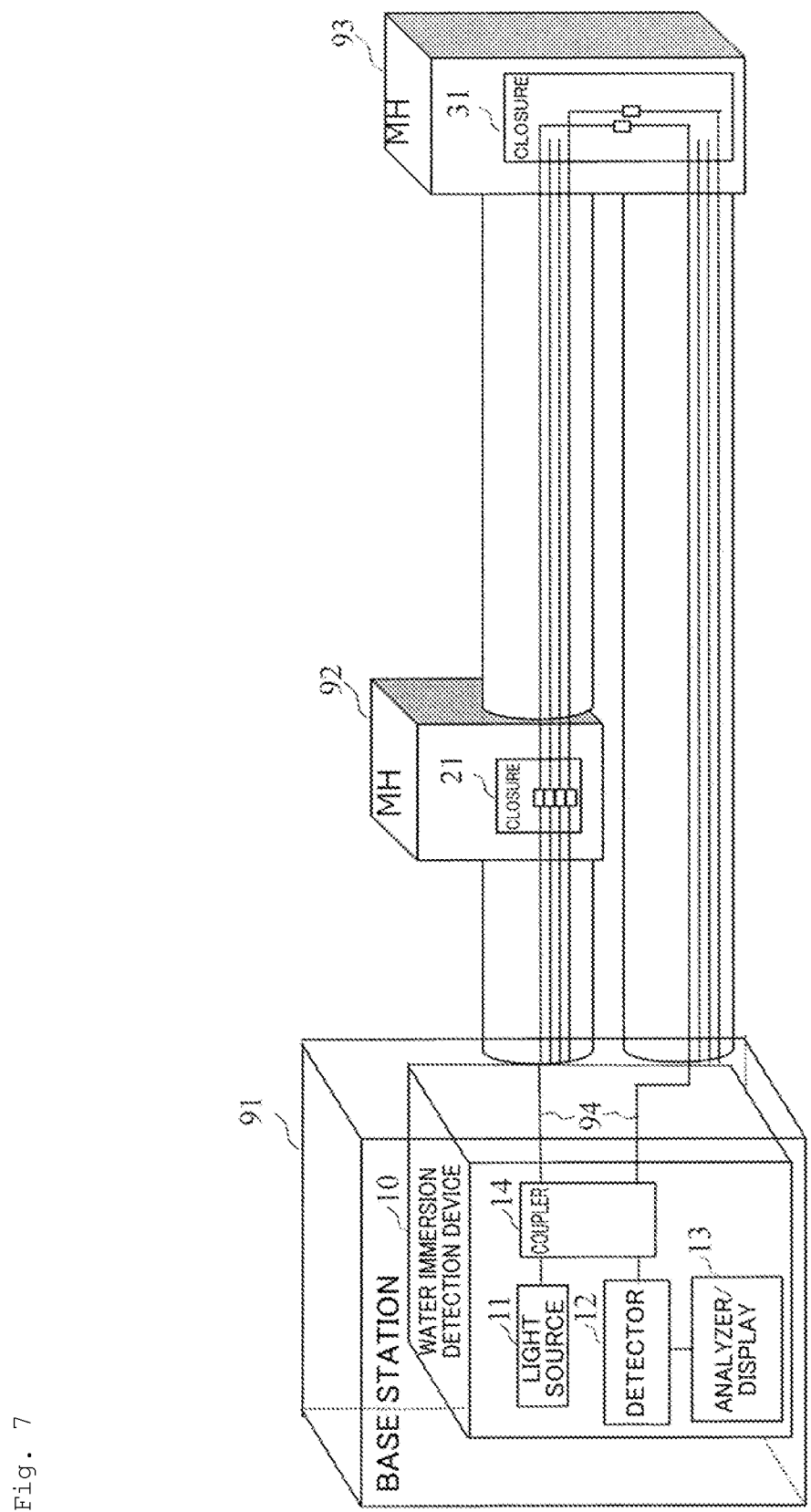
FIG. 7 illustrates a second system configuration example according to the first embodiment.
Figure 8:
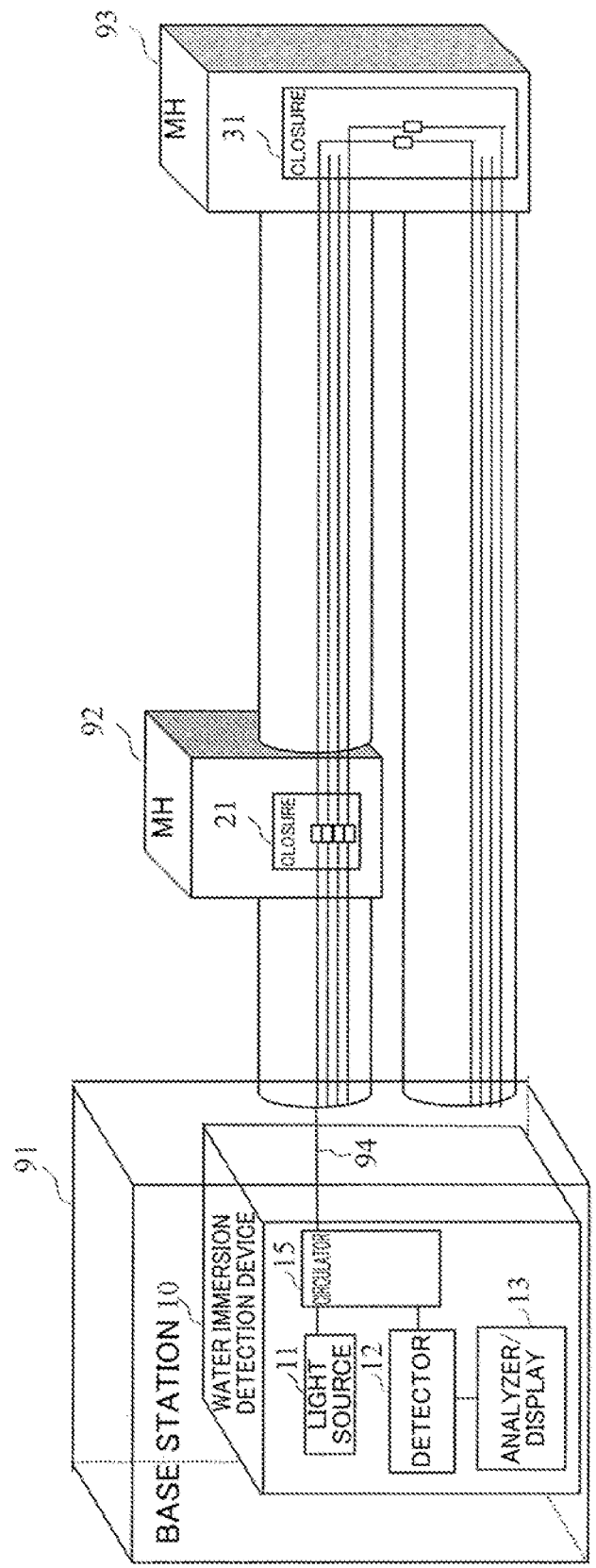
FIG. 8 illustrates a third system configuration example according to the first embodiment.

FIGS. 6 to 8 illustrate examples of a system configuration according to the present disclosure. A water immersion detection device 10 according to the present disclosure is arranged within a base station 91 and is connected to a measurement target optical fiber 94. In a first system configuration example shown in FIG. 6 and a second system configuration example shown in FIG. 7, both ends of the measurement target optical fiber 94 are connected to the water immersion detection device 10. In a third system configuration example shown in FIG. 8, one end of the measurement target optical fiber 94 is connected to the water immersion detection device 10.

Figure 9:
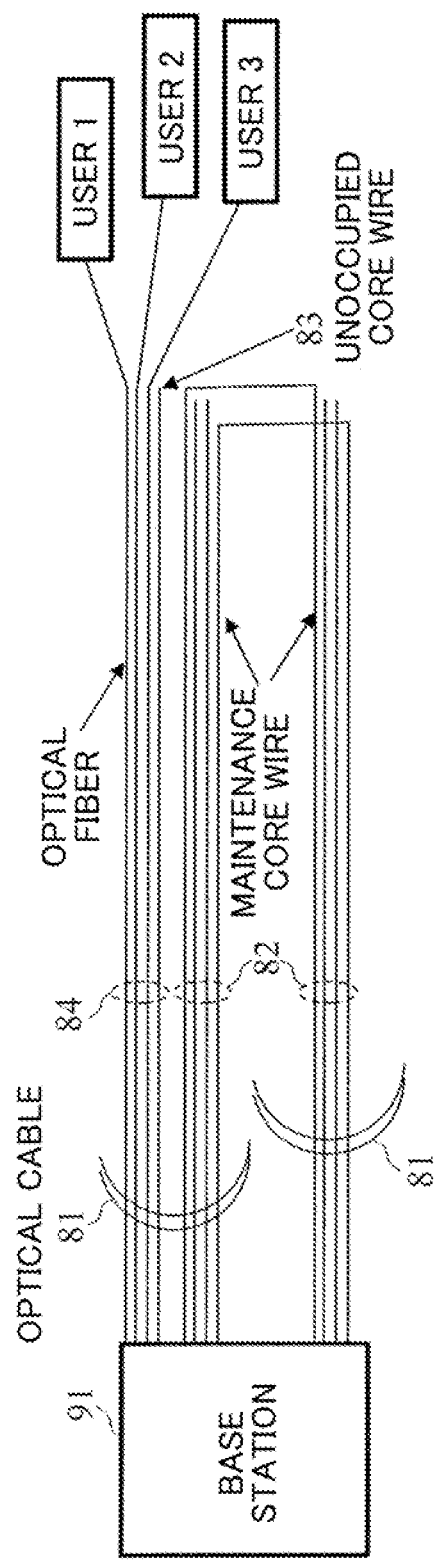
FIG. 9 illustrates an example of a measurement target optical fiber.

FIG. 9 illustrates an example of a configuration of a measurement target optical fiber. A cable 81 is connected to the base station 91. Each cable 81 buried in the ground includes maintenance core wires 82 assembled by a tape. The maintenance core wires 82 extend through closures 21 and 31 shown in FIGS. 6 to 8 and return to the base station 91. The maintenance core wires 82 are laid in a traversable manner. In the present embodiment, the maintenance core wires 82 can be used in the measurement target optical fiber 94 to measure GAWBS at both ends thereof. The present disclosure is not limited to the use of the maintenance core wires 82, and an unoccupied core wire 83 or an aerial cable (not shown) may also be used in the measurement target optical fiber 94 to measure GAWBS at one end thereof.

The water immersion detection device 10 includes a light source 11, a detector 12, and an analyzer/display 13, and measures GAWBS. The light source 11 emits test light to the measurement target optical fiber 94. The test light has any wavelength. If an active line 84 is used in the measurement target optical fiber 94, the wavelength of 1650 nm, which is a test wavelength of the physical network, is used as the wavelength of the test light. The detector 12 detects scattering light obtained as the result of the test light being scattered by the measurement target optical fiber 94. The analyzer/display 13 measures GAWBS based on the scattering light detected by the detector 12. Then, the analyzer/display 13 detects a water immersion in the the measurement target optical fiber 94 based on a change in the spectrum. As described in the section <Principle>, the determination of water immersion uses the line width of a spectrum of GAWBS, or an amount of shift from a Lorenz curve.

The analyzer/display 13 of the water immersion detection device 10 of the present disclosure may also be realized by a computer and a program, and the program can be recorded in a recording medium or can be provided via a network.

In the second system configuration example shown in FIG. 7, the water immersion detection device 10 includes a coupler 14 to form a sagnac loop. As shown in FIG. 7, the present disclosure can employ a measurement system for typical polarized GAWBS. The analyzer/display 13 shown in FIG. 7 may further measure a distance distribution, if GAWBS is measured by a BOTDA (Brillouin Optical Time Domain Analysis).

In the third system configuration example shown in FIG. 8, the water immersion detection device 10 includes a circulator 15. The circulator 15 emits light from the light source 11 to the measurement target optical fiber 94, and emits scattering light from the measurement target optical fiber 94 to the detector 12. In the measurement at one end, if GAWBS is measured by a BOTDR (Brillouin Optical Time Domain Reflectometer), a distance distribution may further be measured.

When a distance distribution is measured, the results as shown in FIG. 3 can be obtained at positions in the longitudinal direction of the cable. By comparing the result obtained at each position with a threshold, it is possible to specify the position at which a water immersion has been detected, and the distance from the water immersion detection device 10. Using a database in which distances from the water immersion detection device 10 to cables and cable installation positions are managed, it is possible to specify the position at which the cable with the detected water immersion is installed.

Figure 10:
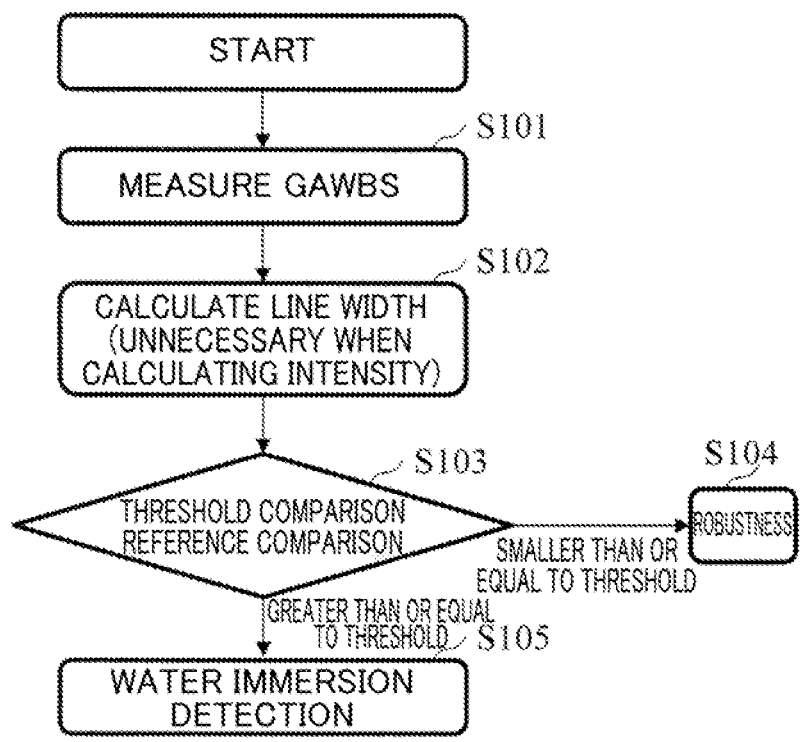
FIG. 10 illustrates an example of a water immersion detection method according to the first embodiment.

FIG. 10 illustrates an example of a water immersion detection method according to the present embodiment. The water immersion detection method of the present embodiment includes a GAWBS measurement step S101, a line width calculation step S102, a threshold comparison step S103, a robustness detection step S104, and a water immersion detection step S105.

In the GAWBS measurement step S101, the light source 11, the detector 12, and the analyzer/display 13 measure GAWBS.

In the line width calculation step S102, the analyzer/display 13 calculates the line width of the spectrum of GAWBS.

In the threshold comparison step S103, the line width of the spectrum of GAWBS is compared with a predetermined threshold. If the line width of the spectrum of GAWBS is less than the predetermined threshold, the analyzer/display 13 determines that the measurement target optical fiber 94 does not immersed in water and is robust (S104). If the line width of the spectrum of GAWBS is greater than or equal to the predetermined threshold, the analyzer/display 13 determines that the measurement target optical fiber 94 is immersed in water. (S105).

In the robustness detection step S104, the analyzer/display 13 displays information indicating that the measurement target optical fiber 94 is not immersed in water and is robust.

In the water immersion detection step S105, the analyzer/display 13 displays information indicating that the measurement target optical fiber 94 is immersed in water. At this time, the analyzer/display 13 may transmit an alarm to a predetermined address.

Note that the present embodiment has given an example in which the line width calculation step S102 that uses the line width of a spectrum is executed, but any water immersion detection method using a spectrum can be used. For example, the line width calculation step S102 may be a step for calculating the kurtosis of a peak of the spectrum, or may be a step for calculating an amount of shift from a Lorenz curve.

As described above, the water immersion detection device 10 of the present embodiment can determine that the measurement target optical fiber 94 is immersed in water. The water immersion detection device 10 preferably performs the above-described water immersion detection method at regular intervals. When such automated measurement is performed, the analyzer/display 13 preferably transmits an alarm to a predetermined address in the water immersion detection step S105.

Second Embodiment

In the first embodiment, an example has been given in which water immersion detection is performed in terms of one measurement target optical fiber 94, but the present disclosure is not limited thereto. For example, optical channel selectors 16 and 17 as shown in FIGS. 11 to 18 may be used to switch the measurement target optical fibers 94-1, 94-2, . . . , 94-N, so that a single water immersion detection device 10 monitors a plurality of core wires or the optical fiber in units of route. Also, the water immersion detection device 10 may perform the determination in units of cable by measuring a distance distribution of a spectrum of GAWBS.

FIGS. 11 to 18 show examples of the water immersion detection device 10 according to the present embodiment. The water immersion detection device 10 according to the present embodiment includes the coupler 14 in the configuration of FIG. 12, includes the circulator 15 in the configuration of FIG. 13, includes an OTDR 51 in the configuration of FIG. 14, includes a BOTDR 52 (Brillouin Optical Time Domain Reflectometer) 52 in the configuration of FIG. 17, or a BOTDA 53 in the configuration of FIG. 18.

Figure 11:
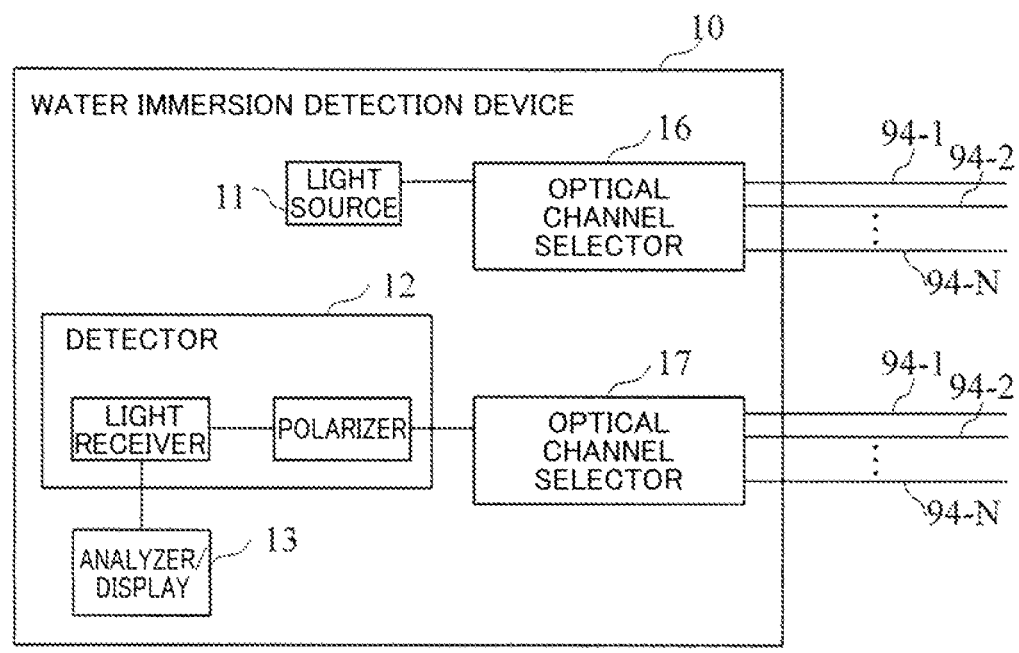
FIG. 11 illustrates a first system configuration according to a second embodiment.

In the configuration of FIG. 11, light from the light source 11 is output to the measurement target optical fiber 94, and a polarizer converts modulation due to GAWBS into intensity modulation of light. The analyzer/display 13 performs, using an oscilloscope, Fourier transformation on a signal of light received by the detector 12, or measures the spectrum of GAWBS using a spectrum analyzer.

Figure 12:
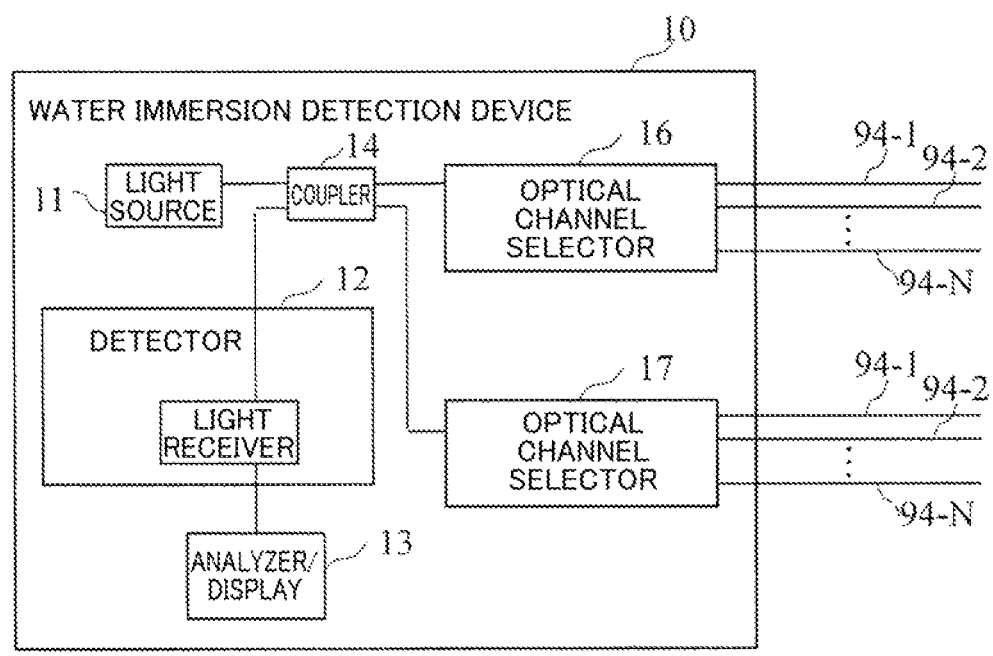
FIG. 12 illustrates a second system configuration according to the second embodiment.

In the configuration of FIG. 12, the coupler 14 outputs light from the light source 11 to both ends of the measurement target optical fiber 94. Also, the coupler 14 multiplexes light from both ends of the measurement target optical fiber 94, and outputs the resultant light. The coupler 14 converts modulation due to GAWBS into intensity modulation of light. The analyzer/display 13 performs, using the oscilloscope, Fourier transformation on a signal of the light received by the detector 12, or measures the spectrum of GAWBS using the spectrum analyzer.

Figure 13:
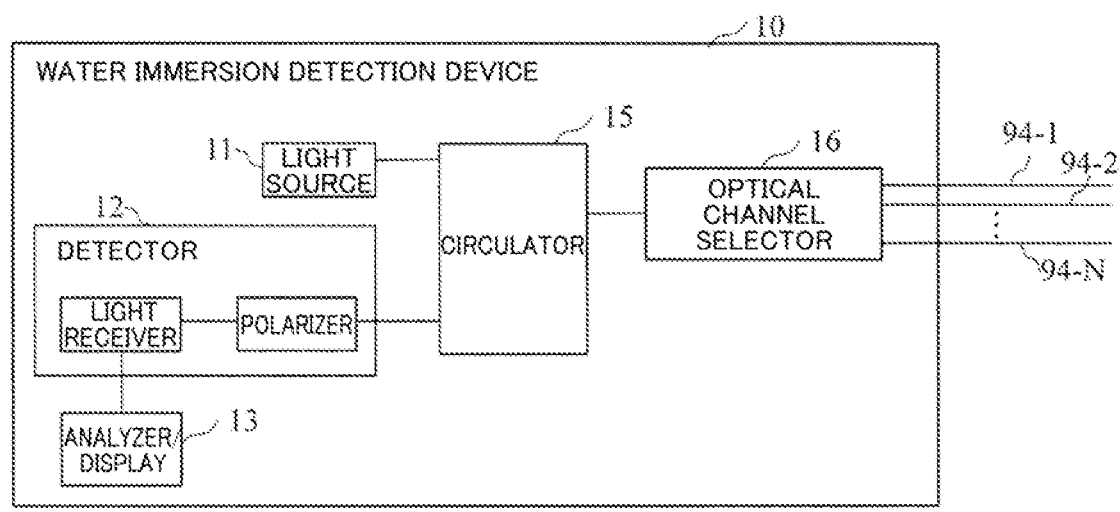
FIG. 13 illustrates a third system configuration according to the second embodiment.

In the configuration of FIG. 13, the circulator 15 outputs light from the light source 11 to the measurement target optical fiber 94. Also, the circulator 15 outputs light returned from the measurement target optical fiber 94. In the detector 10, a polarizer converts modulation due to GAWBS of the light returned from the circulator 15 into intensity modulation of the light. The analyzer/display 13 performs, using the oscilloscope, Fourier transformation on a signal of the light received by the detector 12, or measures the spectrum of GAWBS using the spectrum analyzer.

Figure 14:
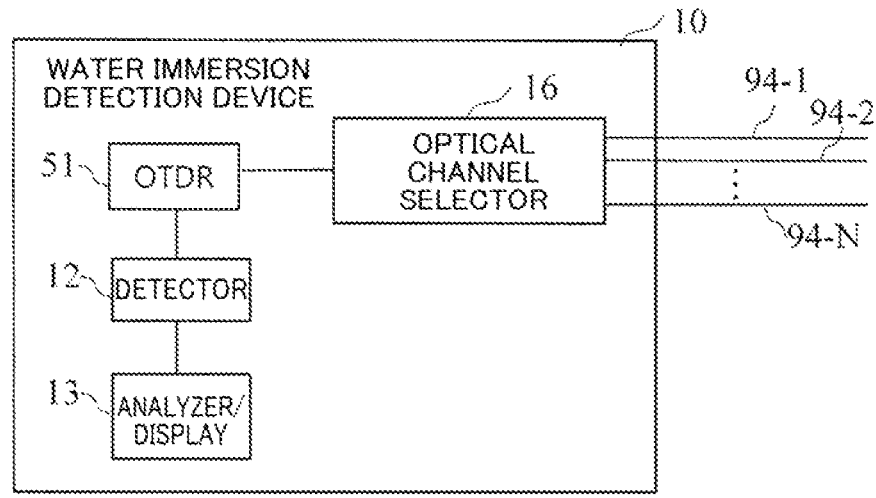
FIG. 14 illustrates a fourth system configuration according to the second embodiment.
Figure 15:
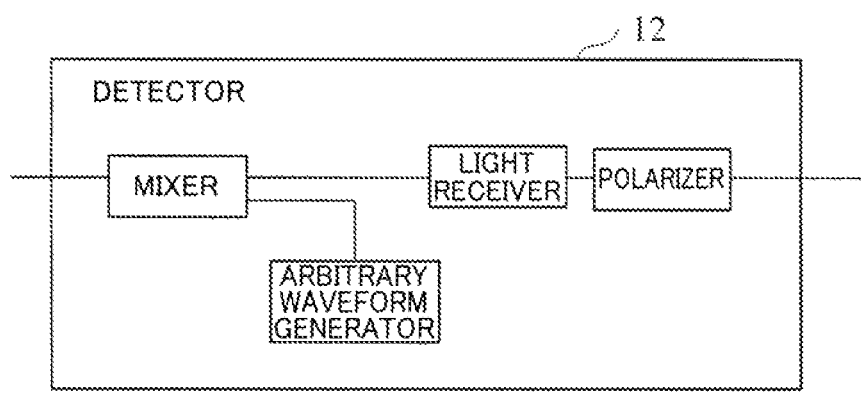
FIG. 15 illustrates a first configuration example of a detector included in the fourth system configuration example according to the second embodiment.
Figure 16:
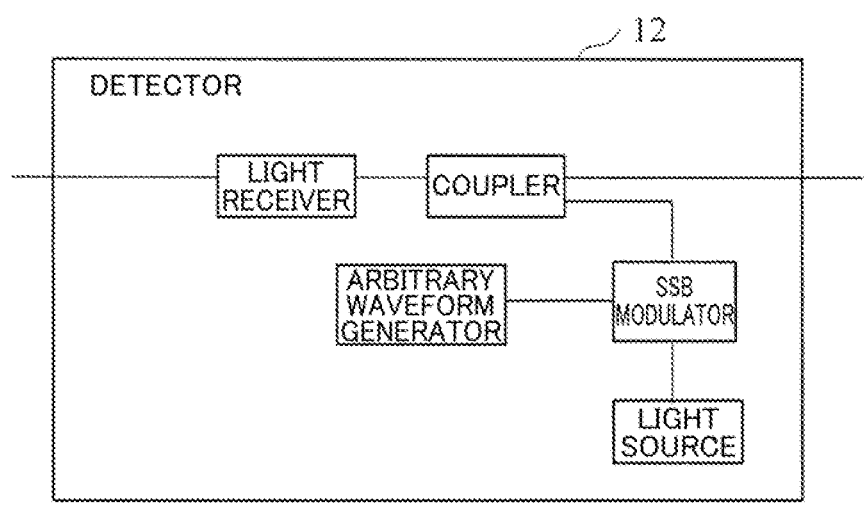
FIG. 16 illustrates a second configuration example of the detector included in the fourth system configuration example according to the second embodiment.

In the configuration of FIG. 14, the OTDR 51 outputs pulsed light to the measurement target optical fiber 94, and outputs light returned from the measurement target optical fiber 94. As shown in FIG. 15, in the detector 12, the polarizer may convert modulation due to GAWBS of the light returned from the OTDR 51 into intensity modulation of the light, or as shown in FIG. 16, a SSB (single side-band) modulator may convert the modulation due to GAWBS into intensity modulation of the light. As a light source that is used when the SSB modulator is employed, the light source 11 is preferably used to reduce measurement noise caused by the light source. The analyzer/display 13 can measure a distance distribution of a spectrum of GAWBS by determining a signal of light received by the oscilloscope of the detector 12, and performing measurement at each frequency while sweeping the frequency using an arbitrary waveform generator.

Figure 17:
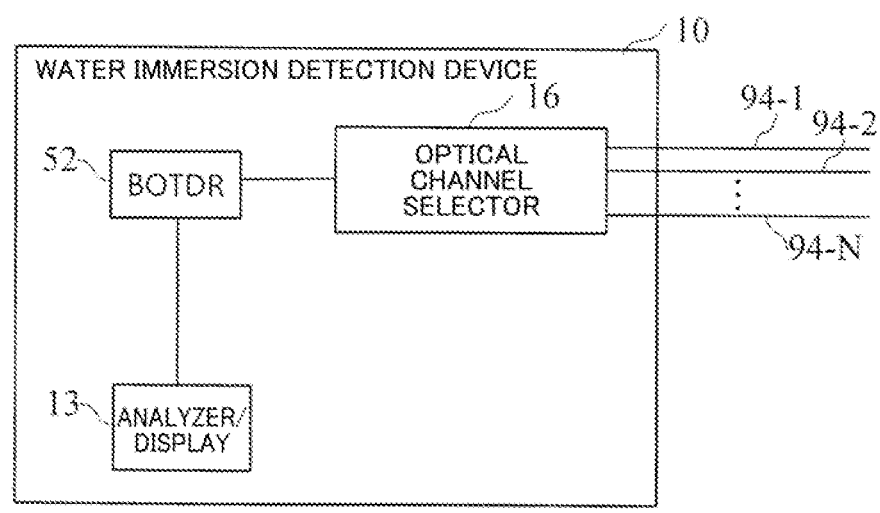
FIG. 17 illustrates a fifth system configuration example according to the second embodiment.

In the configuration of FIG. 17, the BOTDR 52 outputs pulsed light to the measurement target optical fiber 94, and outputs the spectrum of Brillouin scattering measured based on Brillouin scattering light that was returned from the measurement target optical fiber 94 and was modulated by the GAWBS. The analyzer/display 13 measures the GAWBS spectrum by subtracting, from the spectrum of Brillouin scattering measured by the BOTDR 52, a peak frequency (amount of shift of Brillouin scattering frequency) of the spectrum of Brillouin scattering.

Figure 18:
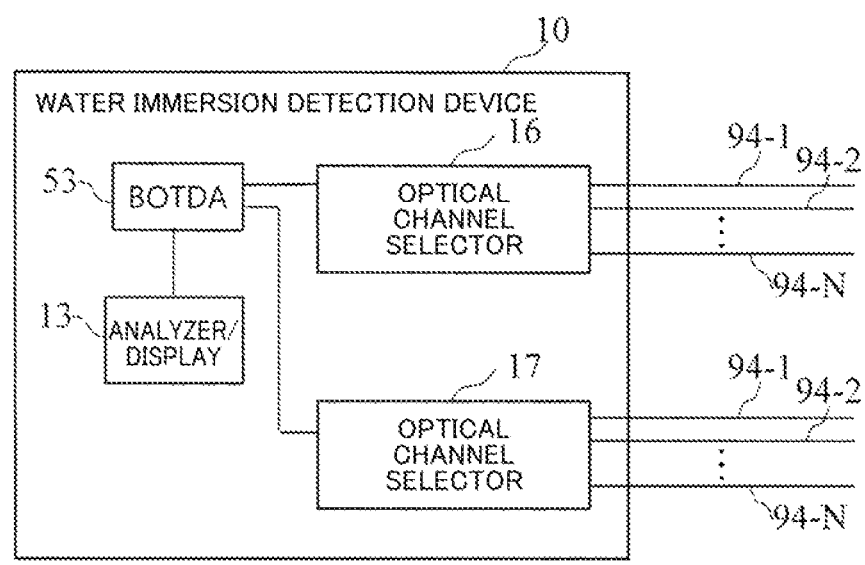
FIG. 18 illustrates a sixth system configuration example according to the second embodiment.

In the configuration of FIG. 18, the BOTDA 53 outputs pulsed light and continuous light to the measurement target optical fiber 94, and outputs a spectrum of Brillouin scattering used to measure a gain or loss, the gain or loss being caused by the Brillouin scattering light modulated by GAWBS from the measurement target optical fiber 94. The analyzer/display 13 measures the GAWBS spectrum by subtracting, from the spectrum of Brillouin scattering measured by the BOTDA 53, a peak frequency (amount of shift of Brillouin scattering frequency) of the spectrum of Brillouin scattering.

Third Embodiment

Figure 19:
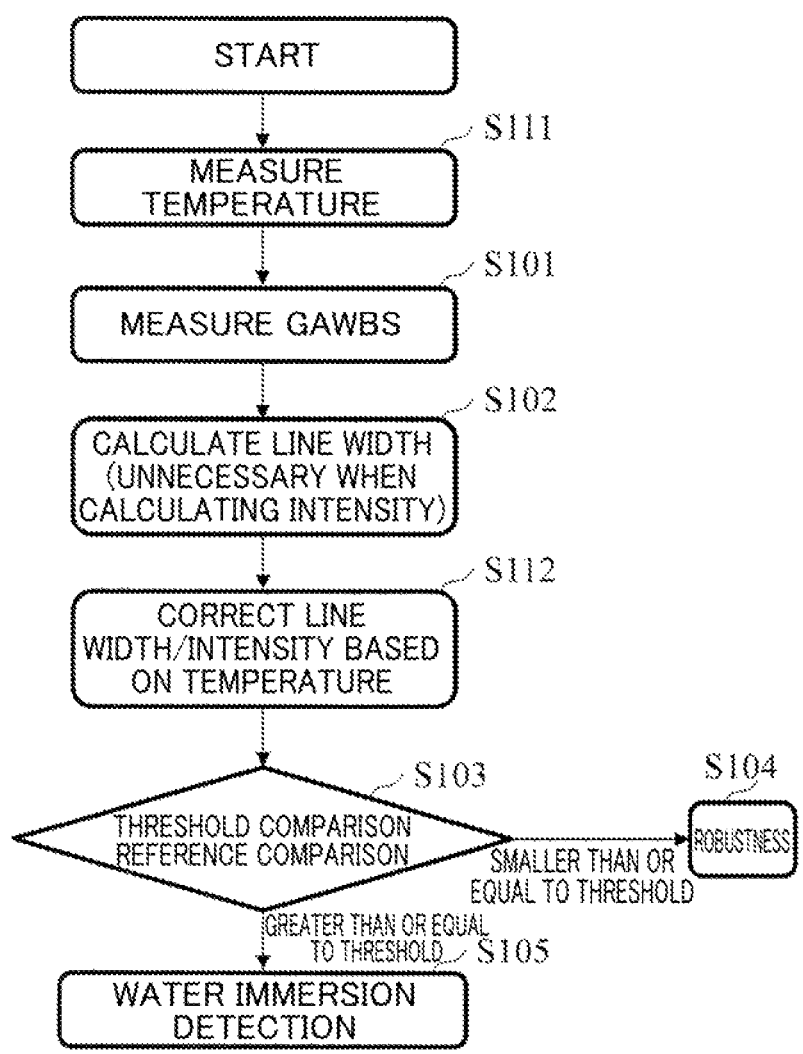
FIG. 19 illustrates a first example of the water immersion detection method according to a third embodiment.

FIG. 19 illustrates a first example of the water immersion detection method according to the present embodiment. The water immersion detection method according to the present embodiment includes a temperature measurement step S111 before the GAWBS measurement step S101, and a temperature correction step S112 between the line width calculation step S102 and the threshold comparison step S103.

In the temperature measurement S111, as in the configuration of FIG. 17, the BOTDR or ROTDR (Raman Optical Time Domain Reflectometry) measures Brillouin scattering or Raman scattering in the measurement target optical fiber 94, and the analyzer/display 13 measures the distance distribution of temperatures of the measurement target optical fiber 94 using the Brillouin scattering spectrum or the Raman scattering spectrum. Alternatively, as in the configuration of FIG. 18, the BOTDA 53 may measure a gain or loss caused by the Brillouin scattering in the measurement target optical fiber 94, and the analyzer/display 13 may measure the distance distribution of temperatures of the measurement target optical fiber 94 using the Brillouin scattering spectrum.

In the temperature correction step S112, the analyzer/display 13 corrects the line width calculated in the line width calculation step S102 based on the temperature of the measurement target optical fiber 94.

Figure 20:
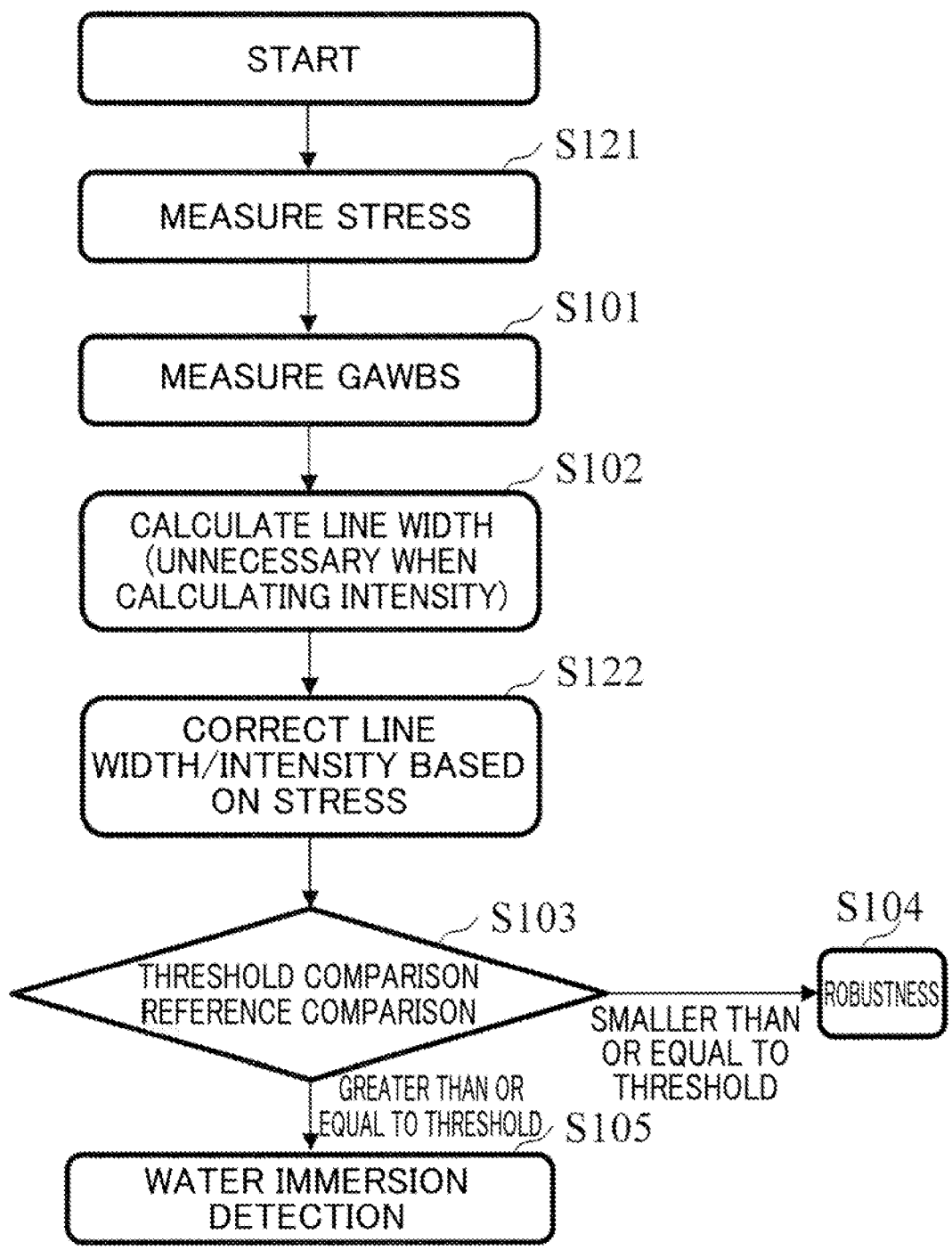
FIG. 20 illustrates a second example of the water immersion detection method according to the third embodiment.

FIG. 20 illustrates a second example of the water immersion detection method according to the present embodiment. The water immersion detection method according to the present embodiment includes a stress measurement step S121 before the GAWBS measurement step S101, and a stress correction step S122 between the line width calculation step S102 and the threshold comparison step S103.

In the stress measurement step S121, as in the configuration of FIG. 17, the BOTDR 52 measures the Brillouin scattering in the measurement target optical fiber 94, and the analyzer/display 13 measures the distance distribution of stresses of the measurement target optical fiber 94 based on the Brillouin scattering spectrum. Alternatively, as in the configuration of FIG. 18, the BOTDA 53 may measure a gain or loss caused by the Brillouin scattering in the measurement target optical fiber 94, and the analyzer/display 13 may measure the distance distribution of stresses of the measurement target optical fiber 94 based on the Brillouin scattering spectrum. In the stress correction step S122, the analyzer/display 13 corrects the line width calculated in the line width calculation step S102 based on the stress of the measurement target optical fiber 94.

Figure 21:
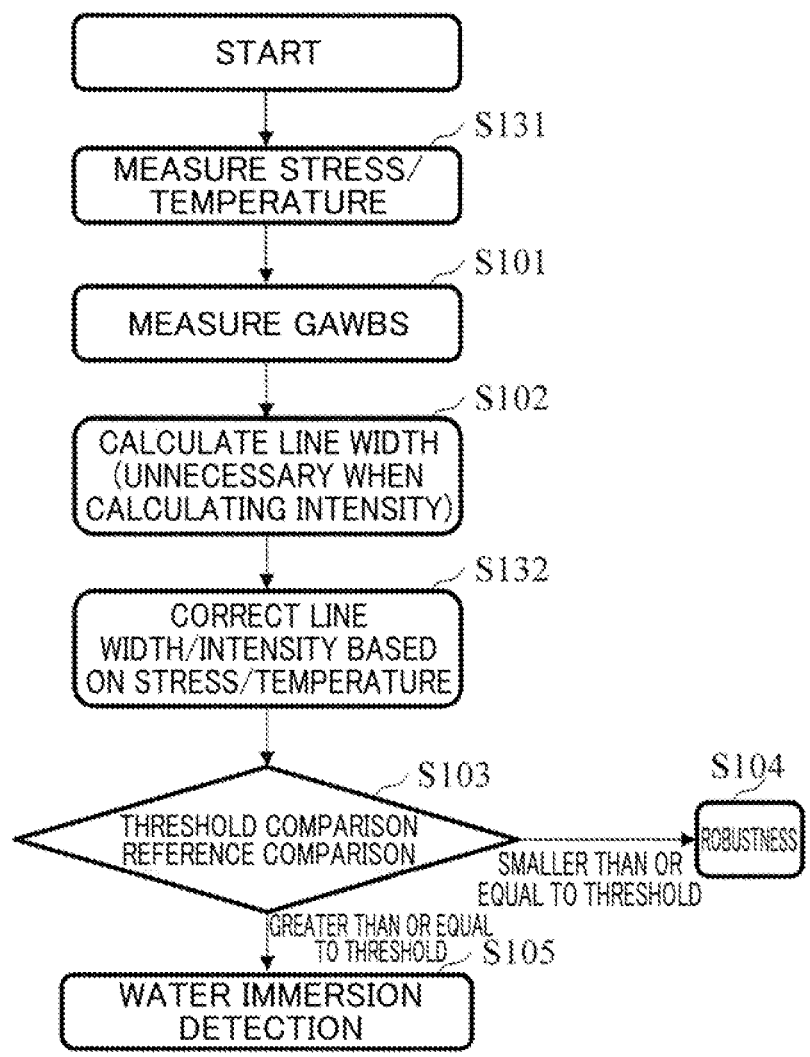
FIG. 21 illustrates a third example of the water immersion detection method according to the third embodiment.

FIG. 21 illustrates a third example of the water immersion detection method according to the present embodiment. The water immersion detection method according to the present embodiment includes a temperature and stress measurement step S131 before the GAWBS measurement step S101, and a temperature and stress correction step S132 between the line width calculation step S102 and the threshold comparison step S103.

In the temperature and stress measurement step S131, as in the configuration of FIG. 17, the BOTDR 52 measures Brillouin scattering in the measurement target optical fiber 94, and the analyzer/display 13 measures the distance distribution of stresses of the measurement target optical fiber 94 based on the Brillouin scattering spectrum. Alternatively, as in the configuration of FIG. 18, the BOTDA 53 may measure a gain or loss due to the Brillouin scattering in the measurement target optical fiber 94, and the analyzer/display 13 may measure the distance distribution of stresses of the measurement target optical fiber 94 based on the Brillouin scattering spectrum. Also, as in the configuration of FIG. 17, the ROTDR 52 measures the Raman scattering in the measurement target optical fiber 94, and the analyzer/display 13 measures the distance distribution of temperatures of the measurement target optical fiber 94 based on the Raman scattering spectrum.

In the temperature and stress correction step S132, the analyzer/display 13 corrects the line width calculated in the line width calculation step S102 based on the temperature and the stress of the measurement target optical fiber 94.

GAWBS is in linear relationship with the temperature. Also, GAWBS is in linear relationship with the stress. Accordingly, the analyzer/display 13 can detect a temperature change or a stress change based on the distance distribution of the measured temperatures and stresses, and can correct the GAWBS.

Note that the present embodiment has given an example in which the line width calculation step S102 using the line width of a spectrum is executed, and the line width is corrected, but the present invention can be applied to any detection method using the spectrum and correction thereof. For example, the line width calculation step S102 may be a step for calculating the kurtosis of a peak of a spectrum. In this case, in the steps S112, S122, and S132, the kurtosis of the peak of the spectrum is corrected.

INDUSTRIAL APPLICABILITY

The present disclosure is applicable to the information and telecommunications industry.

REFERENCE SIGNS LIST

10 Water immersion detection device
11 Light source
12 Detector
13 Analyzer/display
14 Coupler
15 Circulator
16, 17 Optical channel selector
21, 31 Closure
41 Covering
42 Glass
43, 44 GAWBS
51 OTDR
52 BOTDR
53 BOTDA
81 Optical cable
82 Maintenance core wire
83 Unoccupied core wire
84 Active line
91 Base station
92, 93 Manhole
94 Measurement target optical fiber

The invention claimed is:

1. A water immersion detection device comprising:
a light source configured to emit test light to an optical fiber;
a light detector configured to detect scattering light, the scattering light being generated by scattering the fest light by the optical fiber; and
an analyzer configured to be programmed to:
measure guided acoustic wave Brillouin scattering based on the detected scattering light; and
detect a water immersion in the optical fiber based on a characteristic only around a first intensity peak of the measured guided acoustic wave Brillouin scattering,
wherein the measured guided acoustic wave Brillouin scattering has a second intensity peak, and
a first frequency of the first intensity peak is smaller than a second frequency of the second intensity peak.

2. The water immersion detection device according to claim 1,
wherein the characteristic includes at least one of a line width of spectrum of the measured guided acoustic wave Brillouin scattering, a kurtosis of the first intensity peak of the measured guided acoustic wave Brillouin scattering, or a shift amount between Lorenz curves of the measured guided acoustic wave Brillouin scattering and a reference guided acoustic wave Brillouin scattering.

3. The water immersion detection device according to claim 1,
wherein the measured guided acoustic wave Brillouin scattering has a plurality of intensity peaks, and
the first intensity peak has the lowest frequency among frequencies of the plurality of intensity peaks.

4. The water immersion detection device according to claim 1, further comprising
an OTDR configured to measure a temperature of the optical fiber,
wherein the characteristic is corrected based on the measured temperature.

5. The water immersion detection device according to claim 1, further comprising
an OTDR configured to measure a stress of the optical fiber,
wherein the characteristic is corrected based on the measured stress.

6. A water immersion detection method for causing an analyzer to be programmed to execute a process, the water immersion detection method comprising executing on the analyzer the steps of:
causing a light source to emit test light to an optical fiber;
causing a light detector to detect scattering light, the scattering light being generated by scattering the fest light by the optical fiber;
measuring guided acoustic wave Brillouin scattering based on the detected scattering light; and
detecting a water immersion in the optical fiber based on a characteristic only around a first intensity peak of the measured guided acoustic wave Brillouin scattering
wherein the measured guided acoustic wave Brillouin scattering has a second intensity peak, and
a first frequency of the first intensity peak is smaller than a second frequency of the second intensity peak.

7. The water immersion detection method according to claim 6, further comprising the steps of:
measuring at least one of a temperature or a stress of the optical fiber; and
correcting the characteristic based on a result of the measuring of at least one of the temperature and the stress of the optical fiber.

8. The water immersion detection method according to claim 6,
wherein the characteristic includes at least one of a line width of spectrum of the measured guided acoustic wave Brillouin scattering, a kurtosis of the first intensity peak of the measured guided acoustic wave Brillouin scattering, or a shift amount between Lorenz curves of the measured guided acoustic wave Brillouin scattering and a reference guided acoustic wave Brillouin scattering.

9. The water immersion detection method according to claim 6,
wherein the measured guided acoustic wave Brillouin scattering has a plurality of intensity peaks, and
the first intensity peak has the lowest frequency among frequencies of the plurality of intensity peaks.

* * * * *